United States Patent
Clancy et al.

(10) Patent No.: US 7,039,703 B1
(45) Date of Patent: May 2, 2006

(54) DYNAMICALLY MODIFYING FUNCTIONALITY IN A CONFIGURABLE COMMUNICATIONS PROTOCOL STACK

(75) Inventors: T. Terrence Clancy, Concord, NH (US); Vijayakrishna H. Kachinthaya, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 745 days.

(21) Appl. No.: 10/057,672

(22) Filed: Jan. 24, 2002

(51) Int. Cl.
*G06F 15/16* (2006.01)

(52) U.S. Cl. .................. 709/225; 709/235; 709/227; 709/228

(58) Field of Classification Search ............. 709/250, 709/222, 225, 235, 227, 228; 713/193; 370/330
See application file for complete search history.

(56) References Cited

U.S. PATENT DOCUMENTS

| | | | |
|---|---|---|---|
| 4,527,012 A | 7/1985 | Caplan et al. | 179/18 |
| 4,736,364 A | 4/1988 | Basso et al. | 370/68.1 |
| 4,970,721 A | 11/1990 | Aczel et al. | 370/92 |
| 4,993,017 A | 2/1991 | Bachinger et al. | 370/58.2 |
| 4,996,685 A | 2/1991 | Farese et al. | 370/58.1 |
| 5,036,535 A | 7/1991 | Gechter et al. | 379/210 |
| 5,051,992 A | 9/1991 | Taniguchi et al. | 370/110.1 |
| 5,151,935 A | 9/1992 | Slife et al. | 379/240 |
| 5,426,634 A | 6/1995 | Cote et al. | 370/58.2 |
| 6,658,090 B1* | 12/2003 | Harjunen et al. | 379/9.01 |
| 2002/0012329 A1* | 1/2002 | Atkinson et al. | 370/330 |
| 2004/0221170 A1* | 11/2004 | Colvin | 713/193 |

* cited by examiner

*Primary Examiner*—Rupal Dharia
*Assistant Examiner*—Djenane Bayard
(74) *Attorney, Agent, or Firm*—Baker Botts L.L.P.

(57) ABSTRACT

In one embodiment of the present invention, a method for dynamically modifying functionality in a configurable communications protocol stack includes, at an interface device, operating a protocol stack that includes existing protocol stack software operable to process events associated with connections initiated subsequent to the existing protocol stack software being activated for new connections. The method also includes communicating new protocol stack software from a system controller to the interface device, which may be connected to multiple telephony resources, for purposes of modifying the existing protocol stack software operating on the interface device. At the interface device, new protocol stack software is received from the system controller and is operable to process events associated with connections initiated subsequent to the new protocol stack software being activated for new connections. The existing protocol stack software continues to process all events associated with connections initiated before the new protocol stack software was activated, and the new protocol stack software processes all events associated with connections initiated after the new protocol stack software was activated. The existing protocol stack software, upon completion of all connections initiated before the new protocol stack software was activated, is removed, services provided to the telephony resources being substantially uninterrupted by the modification.

23 Claims, 2 Drawing Sheets

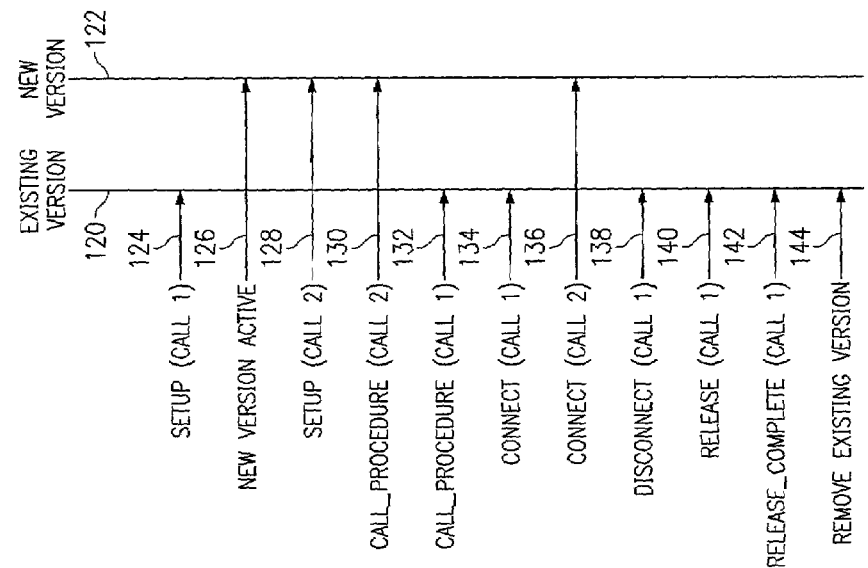
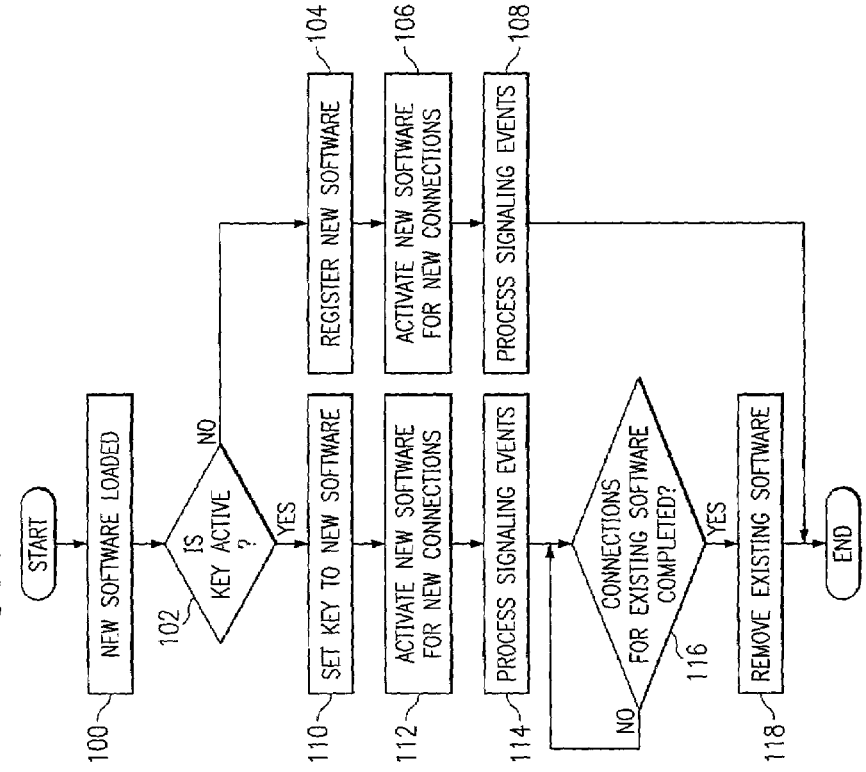

DYNAMICALLY MODIFYING FUNCTIONALITY IN A CONFIGURABLE COMMUNICATIONS PROTOCOL STACK

RELATED APPLICATIONS

This application is related to:

U.S. application Ser. No. 09/596,633 for a "SYSTEM AND METHOD FOR CONFIGURING A COMMUNICATIONS PROTOCOL," filed Jun. 19, 2000 by T. Terrence Clancy, Daniel L. Greene, and Stephen G. Tarry (062891.0379).

TECHNICAL FIELD OF THE INVENTION

This invention relates generally to telecommunications systems, and more particularly to dynamically modifying functionality in a configurable communications protocol stack.

BACKGROUND OF THE INVENTION

Telecommunications systems use a variety of communications protocols and protocol variations to provide telephony services. For example, integrated services digital network (ISDN) communications may rely on any number of different ISDN protocol variations to establish ISDN calls or other connections and process ISDN signaling events associated with those connections. A telephony switch or other telecommunications system may be configured to support one or more ISDN protocol variations using an ISDN protocol stack. The ISDN protocol stack may contain information for establishing ISDN connections and processing associated ISDN signaling events using any ISDN protocol variation for which the protocol stack is configured. At times it may be necessary or desirable to upgrade, replace, or otherwise modify certain functionality within an ISDN or other communications protocol stack, for example, because of a modification of the defining specification of a particular protocol variation or because a problem has been found with the current implementation. As these modifications are performed in previous systems, the quality of service provided to network users may be compromised.

SUMMARY OF THE INVENTION

According to the present invention, disadvantages and problems associated with prior techniques for modifying functionality in a communications protocol stack may be reduced or eliminated.

In one embodiment of the present invention, a method for dynamically modifying functionality in a configurable communications protocol stack includes, at an interface device, operating a protocol stack that includes existing protocol stack software operable to process events associated with connections initiated subsequent to the existing protocol stack software being activated for new connections. The method also includes communicating new protocol stack software from a system controller to the interface device, which may be connected to multiple telephony resources, for purposes of modifying the existing protocol stack software operating on the interface device. At the interface device, new protocol stack software is received from the system controller and is operable to process events associated with connections initiated subsequent to the new protocol stack software being activated for new connections. The existing protocol stack software continues to process all events associated with connections initiated before the new protocol stack software was activated, and the new protocol stack software processes all events associated with connections initiated after the new protocol stack software was activated. The existing protocol stack software, upon completion of all connections initiated before the new protocol stack software was activated, is removed, services provided to the telephony resources being substantially uninterrupted by the modification.

Particular embodiments of the present invention provide one or more technical advantages. For example, certain embodiments may allow isolated replaceable functionality in a communications protocol stack to be dynamically modified without any interruption of service and transparently to users of the service. Such dynamic modification may allow the protocol stack, for example, to be gracefully upgraded while the associated telephony switch or other telecommunications system is handling live calls or other connections and continuing to generate revenue. Certain embodiments may allow for the partial upgrade of a version of downloadable protocol stack software, potentially quickening the upgrade and decreasing unexpected side effects during the upgrade. For example, when a problem with the telecommunications system occurs, a newer version of certain protocol stack software may be needed on a live system to help debug the problem. Certain embodiments may allow the newer version to be installed without taking an associated line card or other network interface out of service. Consequently, service windows that typically must be scheduled during the early morning hours, when traffic is minimal, may be scheduled during more reasonable hours, thereby potentially reducing overtime labor costs. Maintenance costs may also be reduced. Furthermore, because there is a general demand for increased and improved telecommunications services, the ability to upgrade, replace, or otherwise modify protocol stack functionality present in a telecommunications system without interrupting existing services may increase customer satisfaction due to decreased system downtime.

Systems and methods incorporating one or more of these or other technical advantages may be well suited for many telecommunications systems. Certain embodiments of the present invention may provide some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present invention and the advantages thereof, reference is now made to the following descriptions, taken in conjunction with the accompanying drawings in which:

FIG. 6 illustrates an example method for dynamically modifying functionality in a configurable communications protocol stack; and FIG. 7 illustrates an example method for processing signaling events while a configurable communications protocol stack is being dynamically modified.

DESCRIPTION OF EXAMPLE EMBODIMENTS

Figure 1:
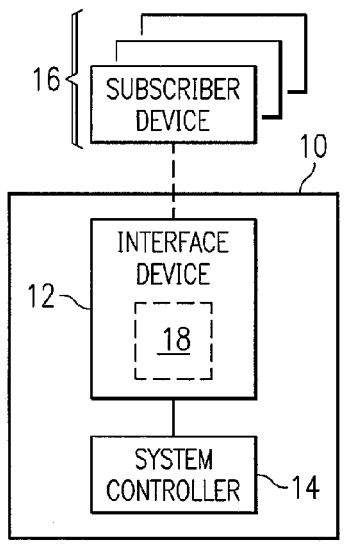
FIG. 1 illustrates an example telecommunications switching system supporting dynamic modification of functionality in a configurable communications protocol stack.

FIG. 1 illustrates an example telecommunications switching system 10 supporting dynamic modification of functionality in a configurable communications protocol stack. Switching system 10 includes an interface device 12 controlled by a system controller 14 and coupled to subscriber devices 16. In general, switching system 10 supplies interface device 12 with signal handling information from system controller 14 and provides for communications and associated signaling between various external devices, including but not necessarily limited to subscriber devices 16, using interface device 12. Although switching system 10 is primarily described, the present invention contemplates dynamically modifying functionality in a configurable communications protocol stack of any suitable telecommunications system.

Interface device 12 may be an embedded, distributed, or other appropriate application, including any suitable software, hardware, and other components, for establishing and maintaining calls or other connections between attached resources. In a particular embodiment, interface device 12 establishes connections between attached ISDN resources, although the present invention contemplates Signaling System Number 7 (SS7), Asynchronous Transfer Mode (ATM), or any other suitable resources according to particular needs. Interface device 12 processes communications and signaling information from attached resources using a communications protocol stack 18. In a particular embodiment, protocol stack 18 may be an ISDN protocol stack, although the present invention contemplates SS7, ATM, or any other suitable protocol stacks according to particular needs. Protocol stack 18 may include any suitable software, hardware, or other components for processing communications and signaling information associated with attached resources according to one or more communications protocols. In particular, protocol stack 18 may perform any appropriate signal handling functions associated with such protocols. Interface device 12 may be coupled to system controller 14 using one or more computer buses, local area networks (LANs), or other links.

Subscriber devices 16 may be any local, remote, or other telecommunications devices coupled to interface device 12 using one or more LANs, metropolitan area networks (MANs), wide area networks (WANs), portions of a global computer network such as the Internet, or any other wireline, optical, wireless, or other links. Interface device 12 may use one or more appropriate protocols to communicate voice, data, video, multimedia, or other communications information, and associated signaling information, with subscriber devices 16. Subscriber devices 16 may include customer premises equipment (CPE), telephony switches, gateways, or any other suitable types of telecommunications devices. In a particular embodiment, subscriber devices 16 are coupled to interface device 12 using primary rate interface (PRI) ISDN lines and communicate using one or more ISDN protocol variations. By way of example, the following description will detail the operation of switching system 10 using ISDN protocols and associated ISDN protocol stack functionality; however, those skilled in the art will recognize that the present invention encompasses any suitable communications protocols and associated protocol stack functionality.

Switching system 10 may include one or more computers at one or more locations, which may be independent or may share data storage, communications, or other resources according to particular needs. Each computer may include one or more suitable input devices, output devices, mass storage media, processors, memory, communications interfaces, or other components for receiving, processing, storing, and communicating information according to the operation of switching system 10. Furthermore, functionality described in connection with interface device 12, system controller 14, and protocol stack 18 may be provided using any suitable software components in association with appropriate hardware, firmware, or other components, depending on the implementation.

In operation, interface device 12 executes within protocol stack 18 certain existing protocol stack software that, for whatever reason, needs to be upgraded, replaced, or otherwise modified. For example, the existing protocol stack software to be modified might correspond to one of multiple protocol variations supported by switching system 10. Accordingly, system controller 14 causes new protocol stack software to be loaded on interface device 12. The new protocol stack software is registered with interface device 12 as a valid application using a functionality identification key or another suitable technique that also uniquely identifies, by variation and version or otherwise, the existing protocol stack software to be modified. The new protocol stack software is activated for new calls or other connections being established using interface device 12 and begins to accept and process signaling events for all such connections. Substantially simultaneously, the existing protocol stack software being modified is deactivated for new connections. Upon activation of the new protocol stack software and deactivation of the existing protocol stack software, the existing protocol stack software continues to process only signaling events for connections that were initiated when the existing protocol stack software was active (before the new protocol stack software was activated). Signaling events associated with connections may be sent to either the existing or the new protocol stack software based on connection reference numbers or other identifiers, time stamps, or any other means of determining when a connection was initiated. In other embodiments, all signaling events are sent to both the example and the new protocol stack software and simply ignored as appropriate, again based on connection reference numbers or other identifiers, time stamps, or any other means of determining when a connection was initiated. Once the existing protocol stack software has gracefully released all of its connections, the existing protocol stack software is unregistered with interface device 12 as a valid application and may be removed from interface device 12 and switching system 10, possibly freeing memory for other uses. One or more protocol stack management processes within system controller 14 or elsewhere within system 10 may manage the modification of protocol stack functionality within interface device 12.

Particular embodiments of the present invention provide one or more technical advantages. For example, certain embodiments may allow isolated replaceable functionality in a communications protocol stack to be dynamically modified without any interruption of service and transparently to users of the service. Such dynamic modification may allow the protocol stack, for example, to be gracefully upgraded while the associated telephony switch or other telecommunications system is handling live calls or other connections and continuing to generate revenue. Certain embodiments may allow for the partial upgrade of a version of downloadable protocol stack software, potentially quickening the upgrade and decreasing unexpected side effects during the upgrade. For example, when a problem with the telecommunications system occurs, a newer version of certain protocol stack software may be needed on a live system to help debug the problem. Certain embodiments may allow the newer version to be installed without taking an associated line card or other network interface out of service. Consequently, service windows that typically must be scheduled during the early morning hours, when traffic is minimal, may be scheduled during more reasonable hours, thereby potentially reducing overtime labor costs. Maintenance costs may also be reduced. Furthermore, because there is a general demand for increased and improved telecommunications services, the ability to upgrade, replace, or otherwise modify protocol stack functionality present in a telecommunications system without interrupting existing services may increase customer satisfaction due to decreased system downtime.

Figure 2:
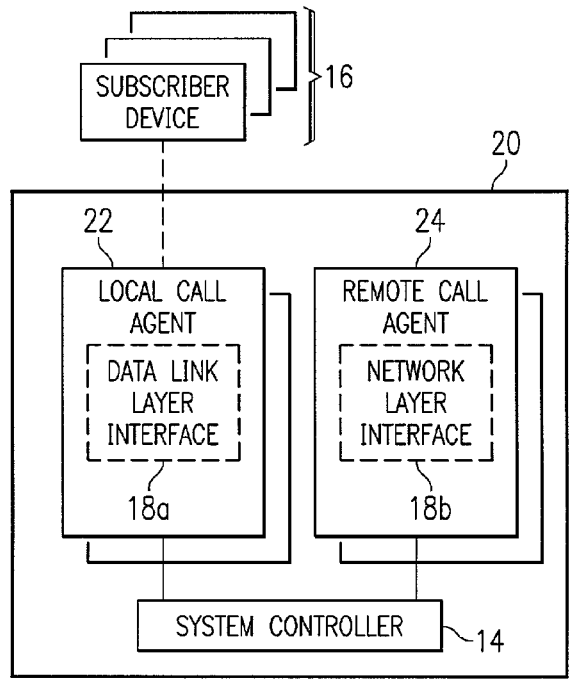
FIG. 2 illustrates an example telecommunications switching system, with local and remote call agents, supporting dynamic modification of functionality in a configurable communications protocol stack.

FIG. 2 illustrates an example telecommunications switching system 20, with local and remote call agents, supporting dynamic modification of functionality in a configurable communications protocol stack. Switching system 20 includes protocol stack 18, which in this case is divided such that a data link layer interface portion 18a of protocol stack 18 is associated with a local call agent 22 and a network layer interface portion 18b of protocol stack 18 is associated with remote call agent 24. As discussed above with reference to switching system 10, in a particular embodiment, protocol stack 18 may be an ISDN protocol stack, although the present invention contemplates SS7, ATM, or any other suitable protocol stacks according to particular needs. As in switching system 10, protocol stack 18 may include any suitable software, hardware, or other components for processing communications and signaling information associated with attached resources according to one or more communications protocols. In particular, protocol stack 18 may perform any appropriate signal handling functions associated with such protocols. Local call agent 22 and remote call agent 24 may each be coupled to system controller 14 using one or more computer buses, LANs, or other links.

Data link layer interface portion 18a and network layer interface portion 18b may be independently upgraded, replaced, or otherwise modified in substantially the same manner as protocol stack 18 of interface device 12 described above with reference to FIG. 1. In one embodiment, given the divided nature of protocol stack 18, more than one protocol stack management process may manage the modification of protocol stack 18 depending on which portion(s) of protocol stack 18 are being modified. For example, a first protocol stack management process may manage modifications to data link layer interface portion 18a within local call agent 22, and a second protocol stack management process may manage modifications to network layer interface portion 18b within remote call agent 24. Technical advantages provided by dynamically modifying data link layer interface portion 18a or network layer interface portion 18b according to the present invention may include the same advantages provided by dynamically modifying the entire protocol stack 18 of interface device 12 according to the present invention. As described above with reference to FIG. 1, advantages may include maintaining uninterrupted service to all subscriber devices 16 while performing upgrades or maintenance. Furthermore, increased economies of scale may be realized because remote call agent 22 typically handles signaling events for many more devices in the network than does local call agent 22.

Figure 3:
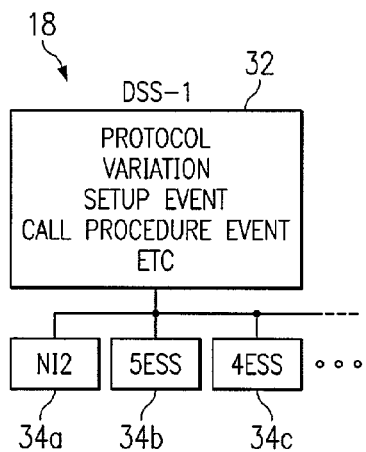
FIG. 3 illustrates an example communications protocol stack having replaceable functionality.

FIG. 3 illustrates an example communications protocol stack 18 having replaceable variations and versions. In certain embodiments, multiple variations and versions of protocol stack software can be supported, configured, and dynamically modified according to the present invention as described above. The ISDN protocol, for example, has many variations, each with potentially numerous versions over time as the defining specifications are modified. Accordingly, it may be desirable to dynamically upgrade, replace, or otherwise modify functionality in an ISDN protocol stack 18 according to particular needs. For example, it may be desirable to dynamically modify ISDN protocol stack software from an existing variation to a new variation while connections are being processed. As another example, it may be desirable to upgrade a particular variation from an existing version to a new version while connections are being processed. In the example embodiment illustrated in FIG. 2, this may require coordination of a change at both data link layer interface portion 18a and network layer interface portion 18b to be effective. If remote call agent 24 is not running the same or a similar protocol stack 18 as local call agent 22, with the ability to upgrade its variation while live traffic is being processed, data link errors will almost certainly occur. In the illustrated embodiment, all variations derive from a common Digital Subscriber Signaling System (DSSx) protocol definition 32. Protocol stack 18 may include any suitable variations 34, any of which may replace another according to particular needs. Example variation 34a is National ISDN 2 (NI2), example variation 34b is a variation associated with the 5ESS switch manufactured by LUCENT TECHNOLOGIES, INC., and example variation 34c is a variation associated with the 4ESS switch also manufactured by LUCENT TECHNOLOGIES, INC.

Figure 4:
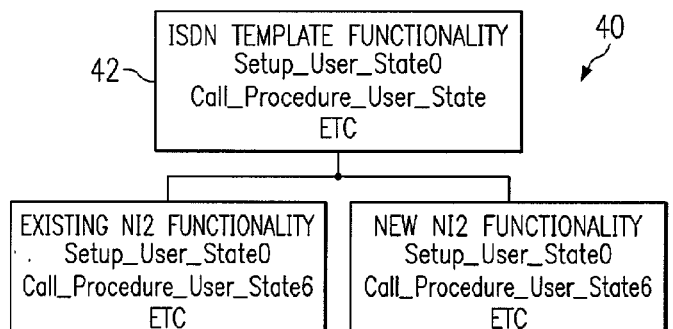
FIG. 4 illustrates an example replacement schema maintained by a protocol stack management process.

FIG. 4 illustrates an example replacement schema 40 maintained by a protocol stack management process. In the illustrated embodiment, ISDN template functionality 42 is used to derive two example versions of protocol stack software, one including existing NI2 functionality 44 and the other including new NI2 functionality 46. Existing NI2 functionality 44 is to be replaced by new NI2 functionality 46, which has a number of functions or methods for handling ISDN signaling events. In one embodiment, the manner of specifying the functionality included in any upgrade, replacement, or other modification may be determined at the time the associated protocol stack software is compiled. The extent of a modification of functionality may be as broad or as narrow as necessary, depending on the number of functions or methods downloaded in connection with new NI2 functionality 46. Protocol stack 18 may be configured as either "user" or "network." When running existing NI2 functionality 44, there may be separate functions or methods to handle signaling events in user mode as opposed to network mode. Example replacement schema 40 illustrates an ISDN protocol stack 18 configured in user mode.

In one embodiment, among the functions or methods available for processing signaling events is SETUP_USER_STATE, a function or method for processing setup events in user state zero. The location of this function or method and its status (registered, activated, etc.) is maintained by the protocol stack management process. Once new NI2 functionality 46 is loaded, it is registered and activated for new connections. The new function or method to process setup events in state zero, included as a part of new NI2 functionality 46, is now the active function or method for processing these events. Substantially simultaneously, existing NI2 functionality 44 is deactivated for new connections. Once all active connections being processed by existing NI2 functionality 44 have been completed, existing NI2 functionality 44 is unregistered and the memory that it occupied may be preferably freed for other uses. While existing NI2 functionality 44 is being replaced, new connections may be sent to the appropriate function or method within new NI2 functionality 46, for example, using a connection reference number or other identifier to differentiate new connections from connections initiated before new NI2 functionality 46 was activated. In one embodiment, while existing NI2 functionality 44 is being replaced, all signaling events are sent to both existing NI2 functionality 44 and new NI2 functionality 46, with events that are sent to the wrong NI2 functionality simply being discarded with respect to that NI2 functionality.

Figure 5:
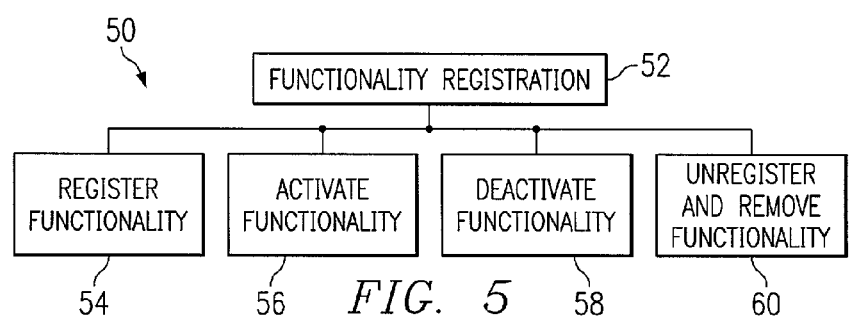
FIG. 5 illustrates an example protocol stack management process.

FIG. 5 illustrates an example protocol stack management process 50. Protocol stack management process 50 may be resident, for example, on system controller 14 or may be distributed in the upgrade, replacement, or other modified software being downloaded to interface device 12 (or to local call agent 22 or remote call agent 24 where protocol stack 18 is divided as in FIG. 2). In one embodiment, a functionality registration process 52 of protocol stack management process 50 is used to activate and deactivate functionality for different versions of the same protocol variation in protocol stack 18. Functionality registration process 52 may include procedures such as a register functionality procedure 54, activate functionality procedure 56, deactivate functionality procedure 58, unregister and remove functionality procedure 60, and any other appropriate procedures. All of these procedures may not be necessary or present to manage the dynamic modification of protocol stack functionality according to the present invention. The present invention encompasses other techniques providing the same or similar capability.

Register functionality procedure 54 may allow only one instance of protocol stack software to actively accept new calls or other connections at a particular time. Where both new and existing protocol stack software are present, existing protocol stack software may be allowed to process signaling events, but only if these events are associated with connections that were established while the existing protocol stack software was active (before activation of the new protocol stack software). In one embodiment, each portion of protocol stack 18 that can be replaced has a unique functionality identification key. The new protocol stack software being used to modify a portion of protocol stack 18 has the same functionality identification key as the corresponding existing protocol stack software already within protocol stack 18. Upon completion of the installation of the new protocol stack software on interface device 12 (or on local call agent 22 or remote call agent 24 where protocol stack 18 is divided as in FIG. 2), the new protocol stack software registers its functionality identification key. Any signaling events that initiate a new connection may now be directed to the new protocol stack software. Any subsequent signaling events associated with those connections may also be directed to the new protocol stack software. Any signaling events that are associated with connections established while the existing protocol stack software was active (before activation of the new protocol stack software) may instead be directed to the existing protocol stack software.

Protocol stack management process 50 may initiate activate functionality procedure 54 to activate the new protocol stack software by sending an activate message to the new protocol stack software or by marking the connection reference number or other identifier and sending new initiation information to the new protocol stack software. The existing protocol stack software may be deactivated using deactivate functionality procedure 58 for new connections, but may remain resident and active until all connections initiated while it was active for new connections (before the new protocol stack software was activated) are completed. Once all connections associated with the existing protocol stack software are completed, the existing protocol stack software may be unregistered and removed using unregister and remove functionality procedure 60, thus potentially freeing memory for other uses.

FIG. 6 illustrates an example method for dynamically modifying functionality in a configurable communications protocol stack. The method begins at step 100, where new protocol stack software, including in certain embodiments software for an entire protocol stack 18, is loaded onto interface device 12 (or on local call agent 22 or remote call agent 24 where protocol stack 18 is divided as in FIG. 2). At step 102, the functionality identification key associated with the new protocol stack software is tested to see if any existing protocol stack software identified by that functionality identification key is active. This step determines whether the functionality being added is entirely new or is an upgrade, replacement, or other modification of existing functionality already within protocol stack 18. If the functionality identification key is not active, such that the functionality being added is entirely new, then the new protocol stack software is registered at step 104, activated for new connections at step 106, and begins to process signaling events for new connections at step 108. At this stage, the new protocol stack software has complete control of all active and future connections, and the method ends.

Returning to step 102, if the functionality identification key is active, such that the functionality being added is an upgrade, replacement, or other modification of existing functionality already within protocol stack 18, then at step 110 the functionality identification key is given to the new protocol stack software to process new connections. At step 112, the new protocol stack software is activated and, at step 114, the new protocol stack software begins processing signaling events associated with new connections. In one embodiment, only signaling events for connections initiated after the new protocol stack software was activated are sent to the new protocol stack software, and only signaling events for connections initiated before the new protocol stack software was activated are sent to the example protocol stack software. In another embodiment, as discussed above, all signaling events are sent to both the new and the existing protocol stack software and discarded as appropriate. The existing protocol stack software continues to process signaling events for connections established while it was the active version for new connections (before the new protocol stack software was activated). At step 116, the existing protocol stack software reports or is checked to determine whether it is handling any active connections. Once all active connections for the existing protocol stack software are successfully completed, the existing protocol stack software is removed at step 118 and the memory it occupied preferably freed for other uses. The new protocol stack software now has complete control of all active and future connections, and the method ends.

FIG. 7 illustrates an example method for processing signaling events while a configurable communications protocol stack is being dynamically modified. Although described by way of example as an ISDN protocol stack, protocol stack 18 may be an SS7, ATM, or any other suitable protocol stack according to particular needs. In the illustrated embodiment, when the method begins, existing ISDN protocol stack functionality 120 is registered and activated for processing new ISDN connection SETUP events.

A first connection is initiated by a SETUP (Call 1) event at step 124, which is sent to and processed by existing functionality 120. Other signaling protocols may provide another name for such an event, such as an Initial Address Message (IAM) in the SS7 protocol. New ISDN protocol stack functionality 122 is installed on interface device 12 and activated at step 126. As described above, signaling events associated with connections initiated after new functionality 122 is activated are processed by new functionality 122. Signaling events associated with connections initiated before activation of new functionality 122 are still processed by existing functionality 120.

Thus, when a second connection is initiated by a SETUP (Call 2) event at step 128, the event is sent to and processed by new functionality 122. Similarly, a CALL_PROCEDURE (Call 2) event is processed by new functionality 122 at step 130. However, CALL_PROCEDURE (Call 1) and CONNECT (Call 1) events are processed by existing functionality 120 at steps 132 and 134, respectively. Continuing along these lines, a CONNECT (Call 2) event is processed by new functionality 122 at step 136, while DISCONNECT (Call 1), RELEASE (Call 1), and RELEASE_COMPLETE (Call 1) events are processed by existing functionality 120 at steps 138, 140, and 142, respectively. Once the last active connection associated with existing functionality 120 is released by the RELEASE_COMPLETE (Call 1) event at step 142, existing functionality 120 is removed from interface device 12 at step 144, and the occupied memory is preferably made available for other uses.

FIGS. 6 and 7 illustrate example methods for modifying communications protocol stacks with modular functionality while the functionality and associated telecommunications system remain active and operating. Those skilled in the art will appreciate that many of the described steps may take place substantially simultaneously or in any suitable order according to the operation of the associated telecommunications system.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

The invention claimed is:

1. A system for dynamically modifying functionality in a configurable communications protocol stack, comprising: a system controller operable to communicate new protocol stack software to an interface device for purposes of modifying existing protocol stack software operating on the interface device; and the interface device, coupled to a plurality of telephony resources and operable to: operate a protocol stack comprising the existing protocol stack software, the existing protocol stack software operable to process events associated with connections initiated subsequent to the existing protocol stack software being activated for new connections; receive the new protocol stack software from the system controller, the new protocol stack software operable to process events associated with connections initiated subsequent to the new protocol stack software being activated for new connections; activate the new protocol stack software for new connections, the existing protocol stack software continuing to process all events associated with connections initiated before the new protocol stack software was activated, the new protocol stack software processing all events associated with connections initiated the new protocol stack software was activated; and remove the existing protocol stack software upon completion of all connections initiated before the new protocol stack software was activated, services provided to the telephony resources being substantially uninterrupted by the modification.

2. The system of claim 1, wherein the interface device comprises a stack management process and each portion of the protocol stack that may be dynamically modified is associated with a unique functionality identification key, the stack management process operable to compare a functionality identification key of the new protocol stack software with a functionality identification key of the existing protocol stack software; if the functionality identification key of the new protocol stack software is not already active, activate the new protocol stack software for all future connections, the new protocol stack software being entirely new to the system; if the functionality identification key of the new protocol stack software is already active, activate the new protocol stack software and deactivate the existing protocol stack software, the new protocol stack software being an upgrade, replacement, or other modification of the existing protocol stack software.

3. The system of claim 1, wherein modifying protocol stack functionality in a configurable communications protocol stack comprises at least one of:
   upgrading the existing protocol stack software with the new protocol stack software, the new protocol stack software being a different version of the same protocol variation as the existing protocol stack software; and
   replacing the existing protocol stack software with the new protocol stack software, the new protocol stack software being a different protocol variation than the existing protocol stack software.

4. The system of claim 1, wherein the new protocol stack software comprises an entire protocol stack.

5. The system of claim 1, wherein the protocol stack is an integrated services digital network (ISDN) protocol stack and the interface device is an ISDN interface device.

6. The system of claim 1, wherein:
   the protocol stack comprises a local data link layer interface portion associated with a local agent and a network layer interface portion associated with a remote call agent; and
   functionality associated with the local data link layer interface and network layer interface portions may be independently modified.

7. The system of claim 6, wherein a first stack management process manages modifications to the local data link layer interface portion and a second stack management process manages modifications to the network layer interface portion.

8. A method for dynamically modifying functionality in a configurable communications protocol stack, comprising:
   at an interface device, operating a protocol stack comprising existing protocol stack software operable to process events associated with connections initiated subsequent to the existing protocol stack software being activated for new connections;
   communicating new protocol stack software from a system controller to the interface device for purposes of modifying the existing protocol stack software operating on the interface device coupled to a plurality of telephony resources;

at the interface device, receiving the new protocol stack software from the system controller, the new protocol stack software operable to process events associated with connections initiated subsequent to the new protocol stack software being activated for new connections;

activating the new protocol stack software for new connections, the existing protocol stack software continuing to process all events associated with connections initiated before the new protocol stack software was activated, the new protocol stack software processing all events associated with connections initiated after the new protocol stack software was activated; and removing the existing protocol stack software upon completion of all connections initiated before the new protocol stack software was activated, services provided to the telephony resources being substantially uninterrupted by the modification.

9. The method of claim 8, wherein the interface device comprises a stack management process and each portion of the protocol stack that may be dynamically modified is associated with a functionality identification key, the stack management process comprising:

comparing a functionality identification key of the new protocol stack software with a unique functionality identification key of the existing protocol stack software;

if the functionality identification key of the new protocol stack software is not already active, activating the new protocol stack software for all future connection, the new protocol stack software being entirely new to the system;

if the functionality identification key of the new protocol stack software is already active, activating the new protocol stack software and deactivating the existing protocol stack software, the new protocol stack software being an upgrade, replacement, or other modification of the existing protocol stack software.

10. The method of claim 8, wherein modifying protocol stack functionality in a configurable communications protocol stack comprises at least one of:

upgrading the existing protocol stack software with the new protocol stack software, the new protocol stack software being a different version of the same protocol variation as the existing protocol stack software; and replacing the existing protocol stack software with the new protocol stack software, the new protocol stack software being a different protocol variation than the existing protocol stack software.

11. The method of claim 8, wherein the new protocol stack software comprises an entire protocol stack.

12. The method of claim 8, wherein the protocol stack is an integrated services digital (ISDN) protocol stack and the interface device is an ISDN interface device.

13. The method of claim 8, wherein:

the protocol stack comprises a local data link layer interface portion associated with a local call agent and a network layer interface portion associated with a remote call agent; and functionality associated with the local data link layer interface and network link interface portions may be independently modified.

14. The method of claim 13, further comprising managing modifications to the local data link layer interface portion using a first stack management process and managing modifications to the network layer interface portion using a second stack management process.

15. Logic encoded in media for dynamically modifying functionality in a configurable communications protocol stack, the logic when executed operable to:

at an interface device, operate a protocol stack comprising existing protocol stack software operable to process events associated with connections initiated subsequent to the existing protocol stack software being activated for new connections;

communicate new protocol stack software from a system controller to the interface device for purposes of modifying the existing protocol stack software operating on the interface device coupled to a plurality of telephony resources;

at the interface device, receive the new protocol stack software from the system controller, the new protocol stack software operable to process events associated with connections initiated subsequent to the new protocol stack software being activated for new connections;

activate the new protocol stack software for new connections, the existing protocol stack software continuing to process all events associated with connections initiated before the new protocol stack software was activated, the new protocol stack software processing all events associated with connections initiated after the new protocol stack software was activated; and remove the existing protocol stack software upon completion of all connections initiated before the new protocol stack software was activated, services provided to the telephony resources being substantially uninterrupted by the modification.

16. The logic of claim 15, wherein the interface device comprises a stack management process and each portion of the protocol stack that may be dynamically modified is associated with a functionality identification key, the stack management process operable to:

compare a functionally identification key of the new protocol stack software with a unique functionality identification key of the existing protocol stack software;

if the functionality identification key of the new protocol stack software is not already active, activate the new protocol stack software for all future connections, the new protocol stack software being entirely new to the system;

if the functionality identification key of the new protocol stack software is already active, activate the new protocol stack software and deactivate the existing protocol stack software, the new protocol stack software being an upgrade, replacement, or other modification of the existing protocol stack software.

17. The logic system of claim 15, wherein modifying protocol stack functionality in a configurable communications protocol stack comprises at least one of:

upgrading the existing protocol stack software with the new protocol stack software, the new protocol stack software being a different version of the same protocol variation as the existing protocol stack software; and replacing the existing protocol stack software with the new protocol stack software, the new protocol stack software being a different protocol variation than the existing protocol stack software.

18. The logic of claim 15, wherein the new protocol stack software comprises an entire protocol stack.

19. The logic of claim 15, wherein the protocol stack is an integrated services digital network (ISDN) protocol stack and the interface device is an ISDN interface device.

20. The logic of claim 15, wherein:
the protocol stack comprises a local data link layer interface portion associated with a local call agent and a network layer interface portion associated with a remote call agent; and
functionality associated with the local data link layer interface and network layer interface portions may be independently modified.

21. The logic of claim 20, further comprising managing modifications to the local data link layer interface portion using a first stack management process and managing modifications to the network layer interface portion using a second stack management process.

22. A system for dynamically modifying functionality in a configurable communications protocol stack, comprising:
means for, at an interface device, operating a protocol stack comprising existing protocol stack software and operable to process events associated with connections initiated subsequent to the existing protocol stack software being activated for new connections;
means for communicating new protocol stack software from a system controller to the interface device for purposes of modifying the existing protocol stack software operating on the interface device coupled to a plurality of telephony resources;
means for, at the interface device, receiving the new protocol stack software from the system controller, the new protocol stack software operable to process events associated with connections initiated subsequent to the new protocol stack software being activated for new connections;
means for activating the new protocol stack software for new connections, the existing protocol stack software continuing to process all events associated with connections initiated before the new protocol stack software was activated, the new protocol stack software processing all events associated with connections initiated after the new protocol stack software was activated; and
means for removing the existing protocol stack software upon completion of all connections initiated before the new protocol stack software was activated, services provided to the telephony resources being substantially uninterrupted by the modification.

23. A system for dynamically upgrading or replacing functionality in a configurable communications protocol stack, comprising:
a system controller operable to communicate new integrated services digital network (ISDN) protocol stack software to an ISDN interface device for purposes of modifying existing ISDN protocol stack software operating on the ISDN interface device; and
the ISDN interface device, coupled to a plurality of telephony resources, comprising a stack management process, and operable to:
operate an ISDN protocol stack comprising the existing ISDN protocol stack software, the existing protocol stack software operable to process ISDN signaling events associated with ISDN connections initiated subsequent to the existing ISDN protocol stack software being activated for new ISDN connections, each portion of the ISDN protocol stack that may be dynamically modified being associated with a unique functionality identification key; and
receive the new ISDN protocol stack software from the system controller, the new ISDN protocol stack software operable to process ISDN signaling events associated with ISDN connections initiated subsequent to the new ISDN protocol stack software being activated for new ISDN connections, the stack management process operable to compare a functionality identification key of the new ISDN protocol stack software with a functionality identification key of the existing ISDN protocol stack software and:
if the functionality identification key of the new ISDN protocol stack software is not already active, activate the new ISDN protocol stack software for all future ISDN connections, the new ISDN protocol stack software being entirely new to the system and operable to process all ISDN signaling events associated with ISDN connections initiated after the new ISDN protocol stack software was activated; and
if the functionality identification key of the new ISDN protocol stack software is already active, activate the new ISDN protocol stack software and deactivate the existing ISDN protocol stack software, the new ISDN protocol stack software being an upgrade or replacement of the existing ISDN protocol stack software, the existing ISDN protocol stack software continuing to process all ISDN signaling events associated with ISDN connections initiated before the new ISDN protocol stack software was activated, the new ISDN protocol stack software processing all ISDN signaling events associated with ISDN connections initiated after the new ISDN protocol stack software was activated; and
remove the existing protocol stack software upon completion of all connections initiated because the new protocol stack software was activated, services provided to the telephony resources being substantially uninterrupted by the modification.

* * * * *